United States Patent
Chen et al.

(10) Patent No.: US 11,890,805 B2
(45) Date of Patent: *Feb. 6, 2024

(54) THREE-DIMENSIONAL PRINTING APPARATUS AND THREE-DIMENSIONAL PRINTING METHOD

(71) Applicant: Young Optics Inc., Hsinchu (TW)

(72) Inventors: Chao-Shun Chen, Hsinchu (TW); Keng-Han Chuang, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 403 days.

This patent is subject to a terminal disclaimer.

(21) Appl. No.: 16/817,931

(22) Filed: Mar. 13, 2020

(65) Prior Publication Data

US 2020/0215812 A1   Jul. 9, 2020

Related U.S. Application Data

(63) Continuation of application No. 15/298,428, filed on Oct. 20, 2016, now Pat. No. 10,625,497.

(30) Foreign Application Priority Data

Oct. 22, 2015   (TW) .................................. 104134726

(51) Int. Cl.
*B29C 64/129*   (2017.01)
*B33Y 30/00*   (2015.01)
(Continued)

(52) U.S. Cl.
CPC .......... *B29C 64/129* (2017.08); *B29C 64/124* (2017.08); *B29C 64/135* (2017.08);
(Continued)

(58) Field of Classification Search
None
See application file for complete search history.

(56) References Cited

U.S. PATENT DOCUMENTS 5,247,180 A * 9/1993 Mitcham ............ G02B 26/0841
  347/241
5,339,158 A * 8/1994 Akiyama ............. H04N 9/3105
  348/757

(Continued)

FOREIGN PATENT DOCUMENTS

WO   WO-2005060619 A2 *   7/2005   .......... G03B 21/204
WO   WO-2014064743 A1 *   5/2014   .......... G02B 26/008

*Primary Examiner* — Michael P. Rodriguez
(74) *Attorney, Agent, or Firm* — Muncy, Geissler, Olds & Lowe, P.C.

(57) ABSTRACT

A three-dimensional printing apparatus includes a container and a projecting structure. The container is configured to contain a liquid photosensitive material. The projecting structure is configured to provide a variety of molding beams to irradiate the liquid photosensitive material. The photoinitiator is suitable for polymerizing with a monomer after receiving the first molding beam with the first wavelength to form a solidified layer with a first color, and the photoinitiator is suitable for polymerizing with the monomer after receiving the second molding beam with the second wavelength to form a solidified layer with a second color, wherein the first color is different from the second color. The projecting structure comprises a light combiner module, disposed on the transmission paths of a variety of light beams. The wavelengths of the first molding beam and the second molding beam are between 355 nm to 415 nm.

20 Claims, 10 Drawing Sheets

(51) Int. Cl.
*B33Y 10/00* (2015.01)
*B29C 64/135* (2017.01)
*B29C 64/124* (2017.01)
*B29C 64/268* (2017.01)
*B29C 64/277* (2017.01)
*B29C 64/20* (2017.01)

(52) U.S. Cl.
CPC ............ *B29C 64/20* (2017.08); *B29C 64/268* (2017.08); *B29C 64/277* (2017.08); *B33Y 10/00* (2014.12); *B33Y 30/00* (2014.12)

(56) References Cited

U.S. PATENT DOCUMENTS

| | | |
|---|---|---|
| 5,340,656 A | 8/1994 | Sachs et al. |
| 6,200,646 B1 * | 3/2001 | Neckers ................. G03F 7/0037 427/512 |
| 6,799,959 B1 | 10/2004 | Tochimoto et al. |
| 8,167,999 B2 | 5/2012 | Alam et al. |
| 2015/0286127 A1 * | 10/2015 | Katou .................. G02B 26/008 353/8 |

* cited by examiner

THREE-DIMENSIONAL PRINTING APPARATUS AND THREE-DIMENSIONAL PRINTING METHOD

This application is a continuation application of co-pending application Ser. No. 15/298,428, filed on Oct. 20, 2016, which claims the benefit of Taiwan application Serial No. 104134726, filed on Oct. 22, 2015, the contents of which are incorporated herein by reference.

TECHNICAL FIELD

The present invention relates to a printing apparatus, and more particularly to a three-dimensional printing apparatus and a three-dimensional printing method.

BACKGROUND

In photocurable molding technology, light beam is used to irradiate liquid photosensitive resin, such that the liquid photosensitive resin is polymerized and solidified to form an object. It is understood that the surface roughness of the formed object depends on the resolution of the optical member, and therefore, the object made by the photocurable molding technology does not need any additional surface processing to reduce the surface roughness due to that the surface of the object is relatively smooth and fine. However, the conventional liquid photosensitive resin is polymerized and solidified by being irradiated by a light beam with one specific wavelength and the liquid photosensitive resin is not replaceable during the printing process, therefore, the object made by the conventional photocurable molding technology has one single color and does not achieve three-dimensional multicolor print effect.

SUMMARY

One object of the present invention is to provide three-dimensional printing apparatus and method able to achieve multi-color three-dimensional printing.

The embodiment of the present invention provides a three-dimensional printing apparatus, which includes a container and a projecting structure. The container is configured to contain a liquid photosensitive material. The projecting structure is configured to provide a variety of molding beams to irradiate the liquid photosensitive material to form a plurality of solidified layers. The projecting structure comprises a light combiner module, disposed on the transmission paths of a variety of light beams. The wavelengths of the first molding beam and the second molding beam are between 355 nm to 415 nm.

Another embodiment of the present invention provides a three-dimensional printing apparatus, which includes a container and a projecting structure. The container is configured to contain a liquid photosensitive material. The projecting structure is configured to provide a variety of molding beams to irradiate the liquid photosensitive material, wherein the variety of molding beams at least comprises a first molding beam with a first wavelength and a second molding beam with a second wavelength, and the first wavelength is different from the second wavelength. The projecting structure comprises a light combiner module and a light valve, disposed on the transmission paths of a variety of light beams, wherein the light combiner module is configured to transmit the variety of light beams toward the light valve in the same direction. The wavelength of at least one of the variety of molding beams is less than 400 nm.

In summary, through providing a liquid photosensitive material containing a variety of photoinitiators and a monomer, selecting a molding beam with a specific wavelength corresponding to a predetermined molding color and irradiating the selected molding beam to the liquid photosensitive material, a solidified layer is formed. Therefore, by only changing the molding beams with different wavelengths, the solidified layers can have different colors and consequentially the printed object formed by the three-dimensional printing method of the present embodiment can have different colors. In addition, through sequentially irradiating the molding beams with different wavelengths to the liquid photosensitive material, an object formed by the sequentially-stacked solidified bodies can have different colors. Further, through simultaneously or non-simultaneously irradiating the molding beams with different wavelengths to different areas of the liquid photosensitive material, the solidified layers on the same level (having the same distance relative to the molding platform) can have different colors. Furthermore, the object printed by the three-dimensional printing apparatus and method of the embodiments of the present invention has smooth and fine surface, therefore, no any additional surface processing is required to reduce the surface roughness of objects.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
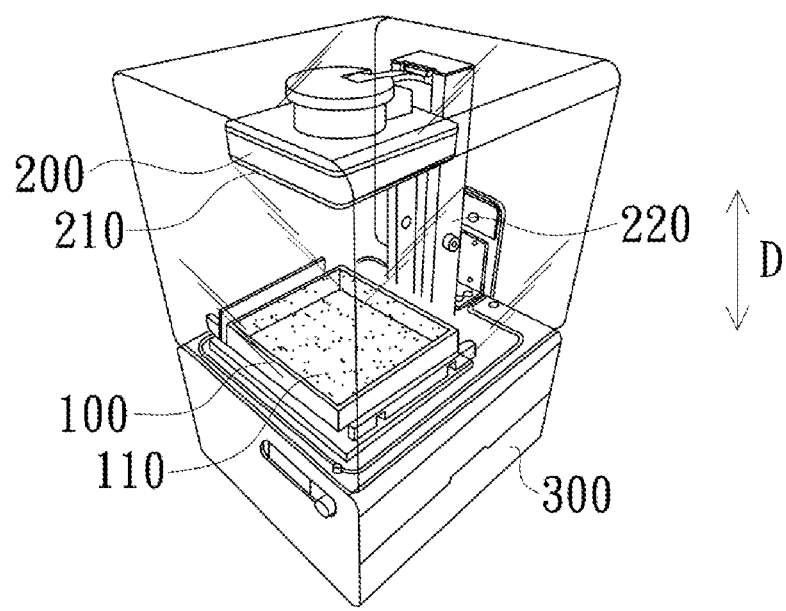
FIG. 1 is a schematic perspective view of a three-dimensional printing apparatus in accordance with an embodiment of the present invention.

Referring to FIG. 1, which is a schematic perspective view of a three-dimensional printing apparatus in accordance with an embodiment of the present invention. As shown, the three-dimensional printing apparatus of the present embodiment includes a container 100, a molding platform 200 and a projecting structure 300. The container 100 is configured to hold a liquid photosensitive material 110. The liquid photosensitive material 110 contains a variety of photoinitiators (not shown) and a curable material (not shown). The curable material may include chemical materials such as polymer, oligomer or monomer. The molding platform 200 is configured to move in a direction D toward or away from the container 100. The projecting structure 300 is configured to provide a variety of molding beams to irradiate the liquid photosensitive material 110. The aforementioned variety of molding beams have different wavelengths and are used to actuate a polymerization between one of the photoinitiators and the monomer thereby forming a solidified layer on the molding platform 200. In the present embodiment, it is to be noted that different photoinitiators have different colors after having a polymerization with the monomers; and after being emitted by the molding beams with different wavelengths, different photoinitiators can have polymerization curing with the monomers.

Another embodiment of the present invention further provides a three-dimensional printing method. The three-dimensional printing method of the present embodiment includes steps of: providing the aforementioned liquid photosensitive material 110; and selecting a molding beam with a specific wavelength corresponding to a predetermined molding color and irradiating the selected molding beam to the liquid photosensitive material 110, thereby forming the solidified layer. The detail of the three-dimensional printing method of the present embodiment will be described in the following with references of FIGS. 1 and 2A-2C, but the present invention is not limited thereto. The projecting structure 300 is disposed under the container 100 and configured to provide three molding beams $I_1$, $I_2$ and $I_3$ with different wavelengths. The container 100 may have a transparent base 105, so that the molding beams $I_1$, $I_2$ and $I_3$ can pass through the transparent base 105 to irradiate the liquid photosensitive material 110. The molding platform 200 may have a molding surface 210, on which the solidified layer is attached. In addition, the molding platform 200 may move in a direction toward or away from the container 100 though a vertical transmission rack 220, and consequentially the molding surface 210 can move up and down in the container 100.

Figure 2C:
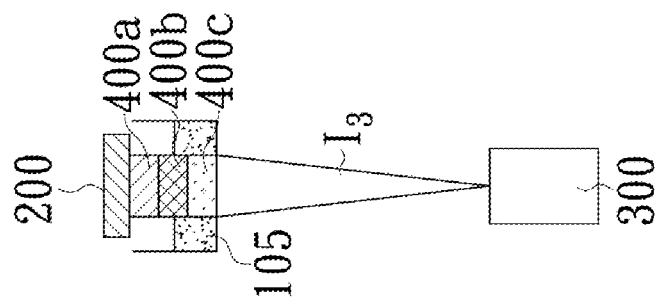
FIGS. 2A-2C are schematic views illustrating a three-dimensional printing method in accordance with an embodiment of the present invention.
Figure 2B:
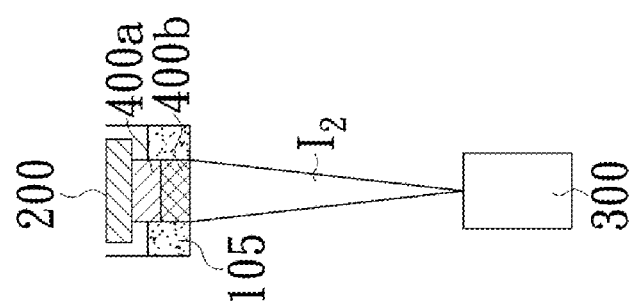
Figure 2A:
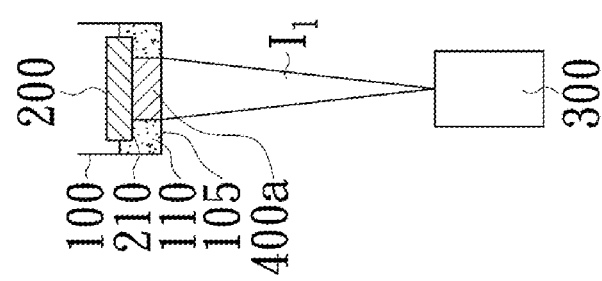
Figure 3:
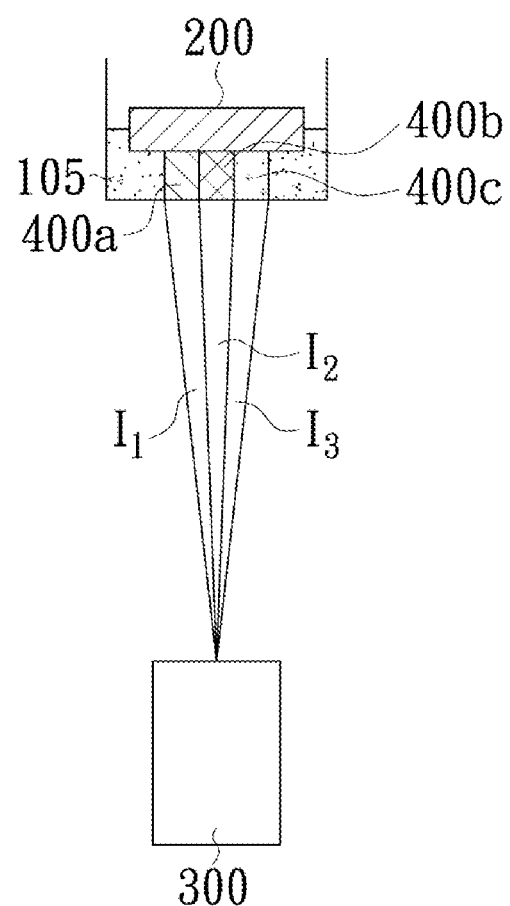
FIG. 3 is a schematic view illustrating a three-dimensional printing method in accordance with another embodiment of the present invention.

As shown in FIG. 2A, the projecting structure 300 first provides the molding beams $I_1$, which actuates a polymerization between a specific photoinitiator in the liquid photosensitive material 110 and the monomer thereby forming a solidified body 400a attached on the molding surface 210 of the molding platform 200. Subsequently, as shown in FIG. 2B, the molding platform 200 moves away from the container 100; and the projecting structure 300 provides the molding beams $I_2$, which actuates a polymerization between another specific photoinitiator in the liquid photosensitive material 110 and the monomer thereby forming a solidified body 400b connected to the solidified body 400a. Subsequently, as shown in FIG. 2C, the molding platform 200 moves further away from the container 100; and the projecting structure 300 provides the molding beams $I_3$, which actuates a polymerization between still another specific photoinitiator in the liquid photosensitive material 110 and the monomer thereby forming a solidified body 400c connected to the solidified body 400b. It is to be noted that the solidified bodies 400a, 400b and 400c have different colors; and therefore, an object formed by the sequentially-stacked solidified bodies 400a, 400b and 400c has three different colors. In other words, by only changing the molding beams $I_1$, $I_2$ and $I_3$ with different wavelengths, the polymerized object formed by the three-dimensional printing method of the present embodiment can have different colors. In addition, as shown in FIG. 3, the molding beams $I_1$, $I_2$ and $I_3$ with different wavelengths may irradiate different areas of the liquid photosensitive material 110 simultaneously or non-simultaneously, so that the polymerized object can have three solidified bodies 400a, 400b and 400c on the same horizontal level.

Figure 4:
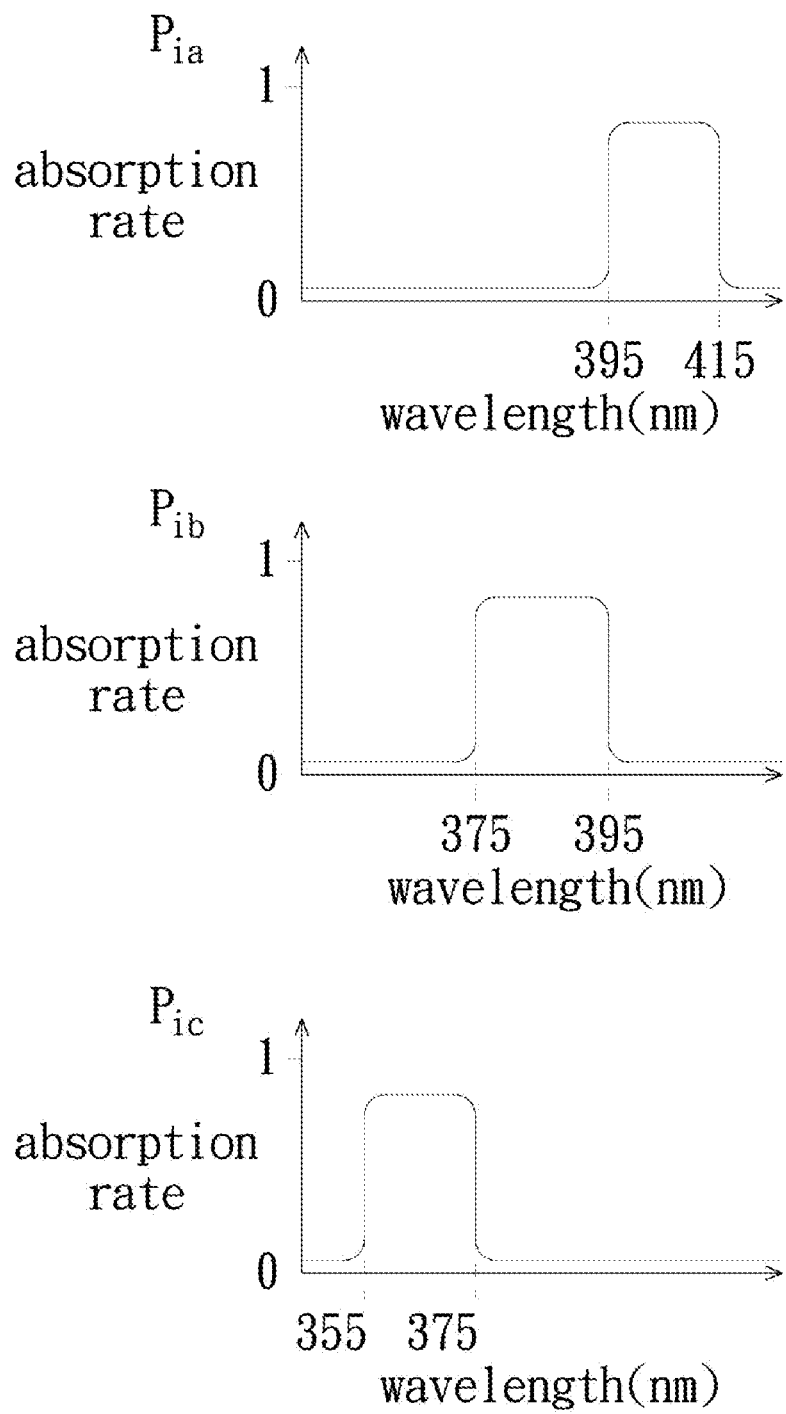
FIG. 4 is a chart illustrating a relationship between the variety of photoinitiators of the liquid photosensitive material and the respective molding beams in accordance with an embodiment of the present invention.

FIG. 4 is a chart illustrating a relationship between the variety of photoinitiators of the liquid photosensitive material and the respective molding beams in accordance with an embodiment of the present invention. As shown in FIG. 4, the variety of photoinitiators of the liquid photosensitive material includes photoinitiators $P_{ia}$, $P_{ib}$ and $P_{ic}$. The photoinitiators $P_{ia}$, $P_{ib}$ and $P_{ic}$ are converted to excited states after receiving energies of the beams with respective wavelengths and then are polymerized with the monomers to form the solidified layer. Specifically, as shown in FIG. 4, by receiving the energies of beams with wavelengths 395-415 nm, 375-395 nm and 355-375 nm, the photoinitiators $P_{ia}$, $P_{ib}$ and $P_{ic}$ are converted to excited states, respectively. Therefore, in one embodiment, through providing the three molding beams with wavelengths 395-415 nm, 375-395 nm and 355-375 nm to irradiate the photoinitiators $P_{ia}$, $P_{ib}$ and $P_{ic}$ respectively, the photoinitiators $P_{ia}$, $P_{ib}$ and $P_{ic}$ are actuated to the excited states and can be polymerized with the monomers. One of ordinary skill in the art would understand that the liquid photosensitive material may contain two, three more even more types of photoinitiators, and correspondingly the projecting structure 300 is configured to emit two, three more even more types of molding beams with different wavelengths, and the wavelengths of the molding beams are not limited to the aforementioned exemplary values. The detail of how the projecting structure providing the molding beams with different wavelengths will be described in the following.

Figure 5:
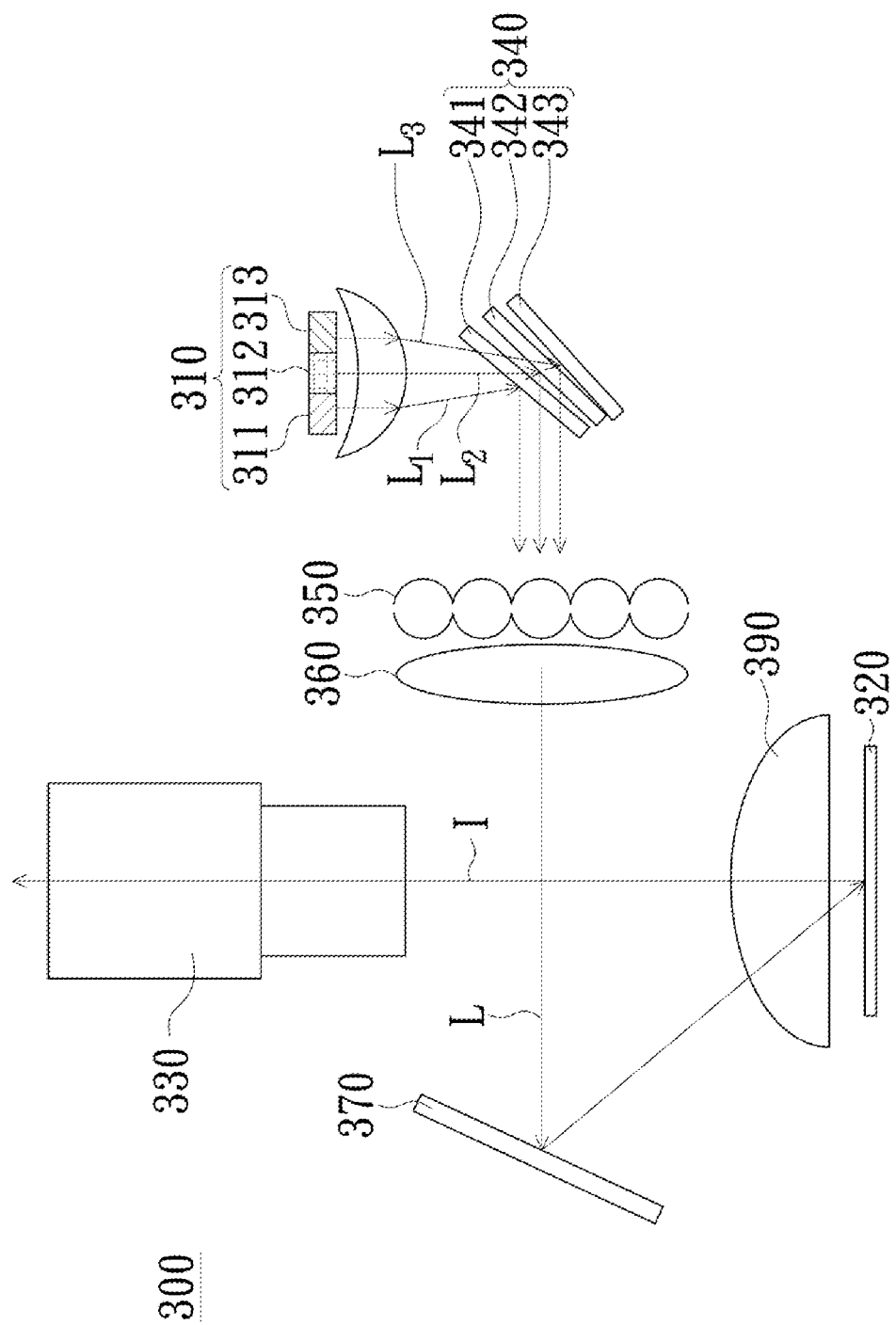
FIG. 5 is a schematic view of a projecting structure in accordance with an embodiment of the present invention.

FIG. 5 is a schematic view of a projecting structure in accordance with an embodiment of the present invention. As shown, the projecting structure 300 of the present embodiment includes a light source assembly 310, a light valve 320, a lens 330 and a light combiner module 340. The light source assembly 310 includes a first light emitting element 311 configured to emit a first light beam $L_1$, a second light emitting element 312 configured to emit a second light beam $L_2$ and a third light emitting element 313 configured to emit a third light beam $L_3$, wherein the first light beam $L_1$, the second light beam $L_2$ and the third light beam $L_3$ have different wavelengths. The first light emitting element 311, the second light emitting element 312 and the third light emitting element 313 are light-emitting diode elements or laser elements, but the present invention is not limited thereto. To coordinate with FIG. 4, the wavelengths of the first light beam $L_1$, the second light beam $L_2$ and the third light beam $L_3$ are 405 nm, 385 nm and 365 nm, respectively; but the present invention is not limited thereto.

The light valve 320 is configured to convert a variety of light beams L (that is, the first light beam $L_1$, the second light beam $L_2$ and the third light beam $L_3$ in FIG. 5) into a variety of molding beams I with different wavelengths. Specifically, the light valve 320 converts the first light beam $L_1$, the second light beam $L_2$ and the third light beam $L_3$ into the first molding beam $I_1$, the second molding beam $I_2$ and the third molding beam $I_3$, respectively. In the present embodiment, the light valve 320 may be a reflective light valve, such as a digital micro-mirror device (DMD) or a liquid-crystal-on-silicon panel (LCOS panel). In another embodiment, the light valve 320 may be a transmissive liquid crystal panel or an element having the same efficacy.

The lens 330 is provided on the transmission paths of the variety of molding beams I and configured to make the variety of molding beams I irradiate the liquid photosensitive material 110 in the container 100 (as illustrated in FIGS. 2A-2C).

The light combiner module 340 is provided on the transmission paths of the variety of light beams L and disposed between the light source assembly 310 and the light valve 320. The light combiner module 340 is configured to transmit the variety of light beams L toward the light valve 320. The light combiner module 340 includes a first dichroic mirror 341, a second dichroic mirror 342 and a third dichroic mirror 343, through which the first light beam L1, the second light beam L2 and the third light beam L3 are transmitted to the light valve 320 in the same direction, respectively.

In addition, other optical components such as light-equalizing element 350 and lens 360 may be provided on the transmission paths, so that the light beam L can irradiate the light valve 320 more uniformly; wherein the light beam L herein is referred to as the first light beam $L_1$, the second light beam $L_2$, the third light beam $L_3$ or a combination there of. The light-equalizing element 350 may be a light integration rod, a lens array or an optical element having the same efficacy; wherein the light-equalizing element 350 in FIG. 5 is exemplified by a lens array. In addition, a mirror 370 may be provided to reflect the light beam L to the light valve 320; and a field lens 390 may be provided in front of the light valve 320.

Figure 6:
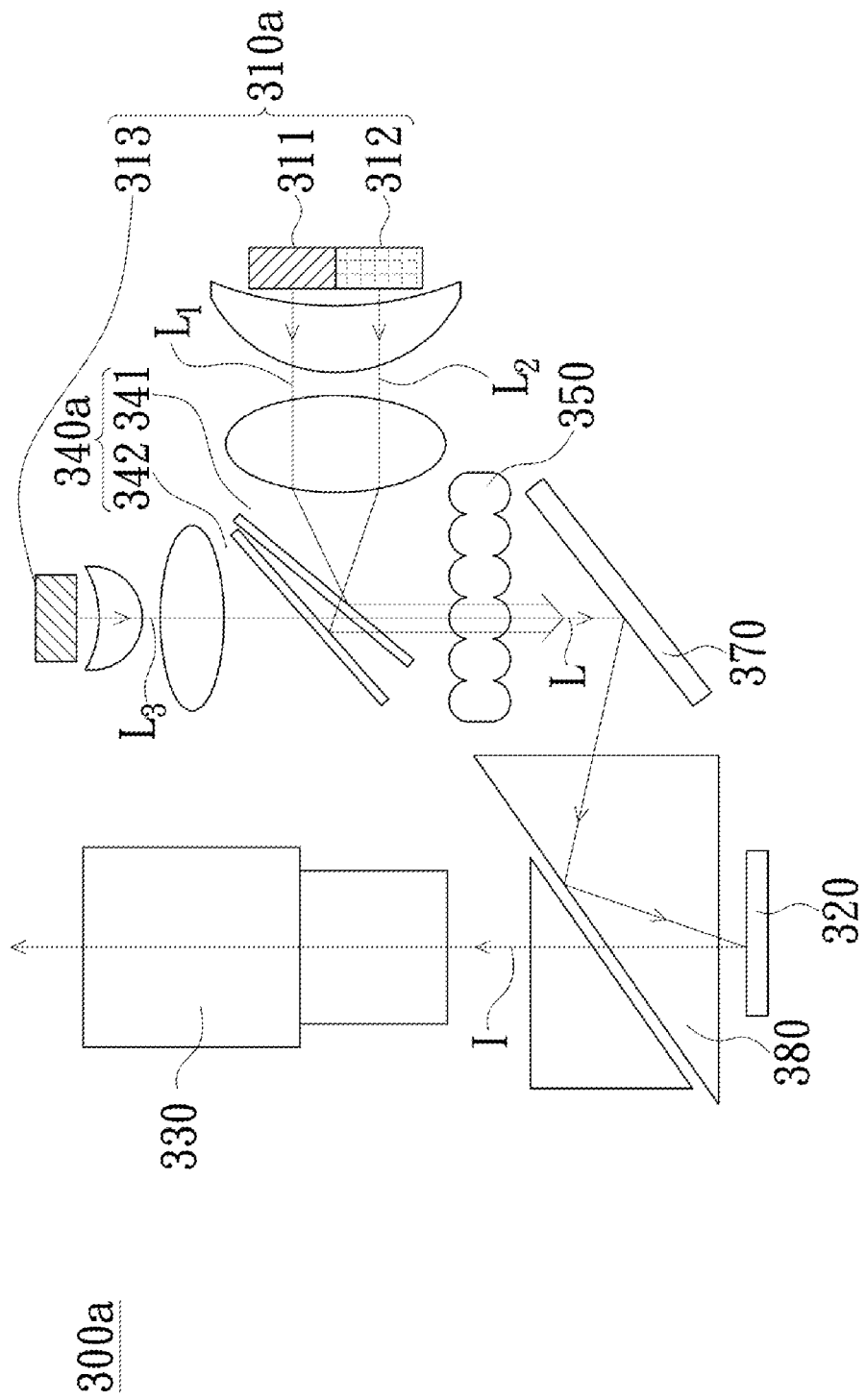
FIG. 6 is a schematic view of a projecting structure in accordance with another embodiment of the present invention.

FIG. 6 is a schematic view of a projecting structure in accordance with another embodiment of the present invention. As shown, the projecting structure 300a of the present embodiment is similar to the projecting structure 300 of FIG. 5; thus, only the differences between the two projecting structures will be described in the following.

In the present embodiment, the first light emitting element 311 is connected to the second light emitting element 312; and the third light emitting element 313 is separated with the first light emitting element 311 and the second light emitting element 312. The light combiner module 340a includes the first dichroic mirror 341 and the second dichroic mirror 342. The first dichroic mirror 341 is disposed between the second dichroic mirror 342 and the first light emitting element 311/the second light emitting element 312. The first dichroic mirror 341 and the third light emitting element 313 are disposed on the two sides of the second dichroic mirror 342.

In addition, the first light beam $L_1$, the second light beam $L_2$ and the third light beam $L_3$ pass through the light-equalizing element 350 and then are transmitted to the mirror 370. Then, the mirror 370 reflects the light beam L to an internal total reflection prism 380. Then, the internal total reflection prism 380 reflects the light beam L to the light valve 320. Then, the light valve 320 converts the light beam L into the molding beam I. Then, the molding beam I pass through the internal total reflection prism 380 and is transmitted toward the lens 330.

Figure 7:
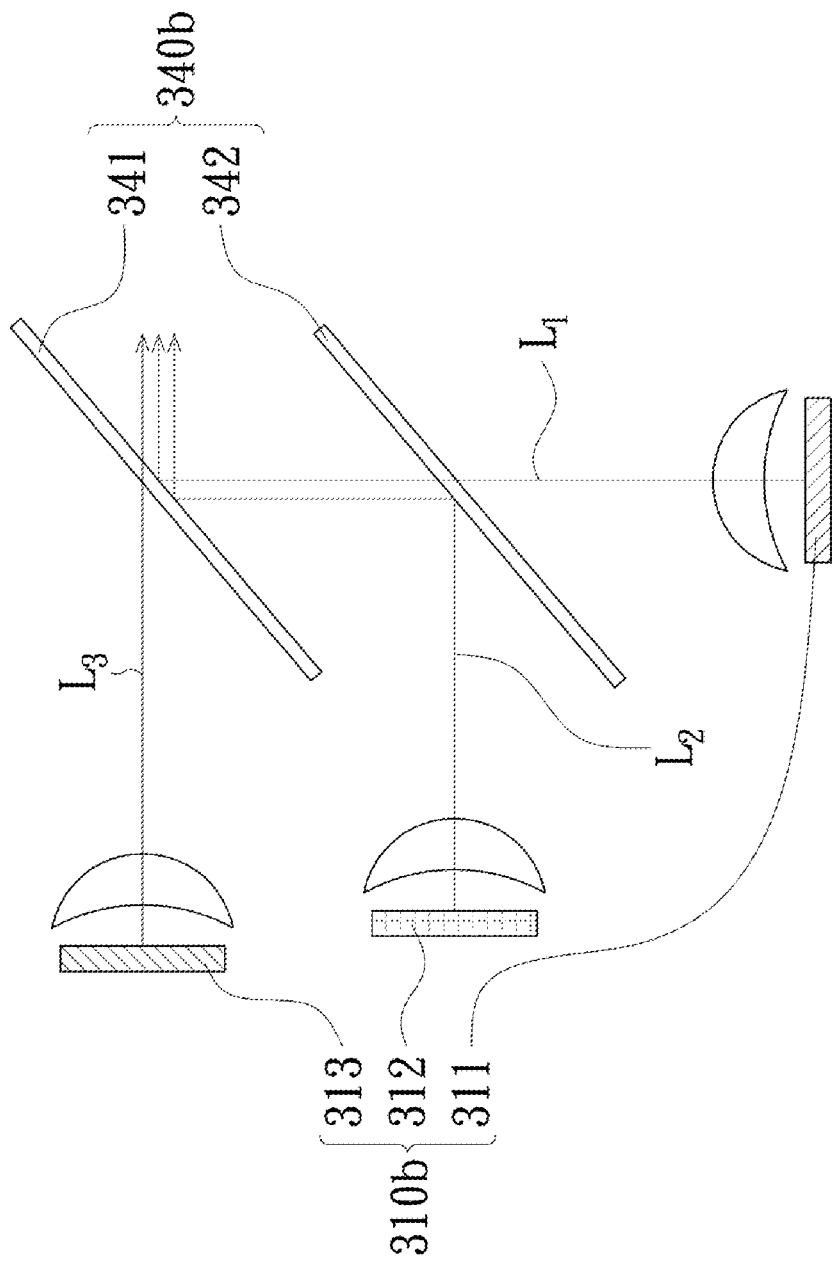
FIGS. 7-10 are schematic views of light source assembly and light combiner module in accordance with a plurality of embodiments of the present invention.

FIGS. 7-10 are schematic views of light source assembly and light combiner module in accordance with a plurality of embodiments of the present invention. As shown in FIG. 7, the light source assembly 340b of the present embodiment includes the first light emitting element 311, the second light emitting element 312 and the third light emitting element 313, which are disposed separately and configured to emit the first light beam L1, the second light beam L2 and the third light beam L3, respectively. The light combiner module 340b includes the first dichroic mirror 341 and the second dichroic mirror 342. The first dichroic mirror 341 is disposed at the intersection of the transmission paths of the first light beam L1 and the third light beam L3. The second dichroic mirror 342 is disposed at the intersection of the transmission paths of the first light beam L1 and the second light beam L2. One of ordinary skill in the art would understand that the disposition of the light source assembly 310b and the light combiner module 340b allows the first light beam L1, the second light beam L2 and the third light beam L3 originally having different transmission paths can be eventually transmitted to the light valve through the same transmission path. In addition, other optical elements may be provided between the light combiner module 340b and the light valve in response to the actual requirements.

Figure 8:
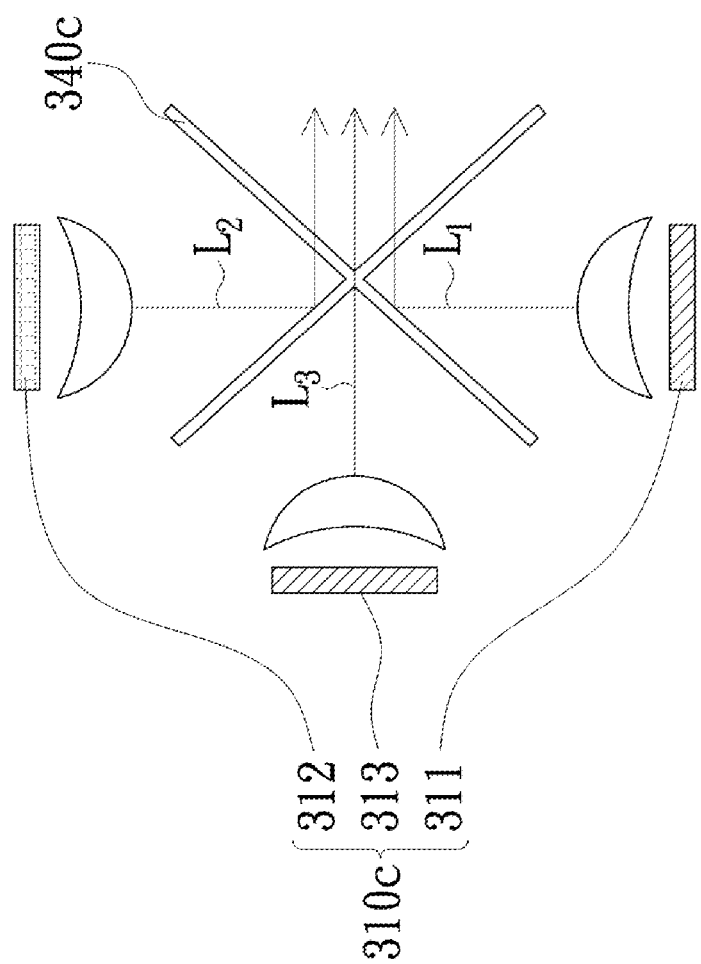

Please refer to FIG. 8. As shown, the structures of light source assembly and light combiner module of the present embodiment of FIG. 8 are similar to that of FIG. 7; thus, only the differences between the two structures will be described in the following. In the present embodiment, the light combiner module 340c is an X-shaped light combiner element, which is disposed at the intersection of the transmission paths of the first light beam $L_1$, the second light beam $L_2$ and the third light beam $L_3$ emitted from the light source assembly 310c. Thefirst light emitting element 311 and the second light emitting element 312 are disposed on the two sides of the light combiner module 340c. The light combiner module 340c can reflect the first light beam $L_1$ and the second light beam $L_2$, and the third light beam $L_3$ can pass through the light combiner module 340c; therefore, the first light beam $L_1$, the second light beam $L_2$ and the third light beam $L_3$ can be transmitted to the light valve in the same direction. In addition, other optical elements may be provided between the light combiner module 340c and the light valve in response to the actual requirements.

Figure 9:
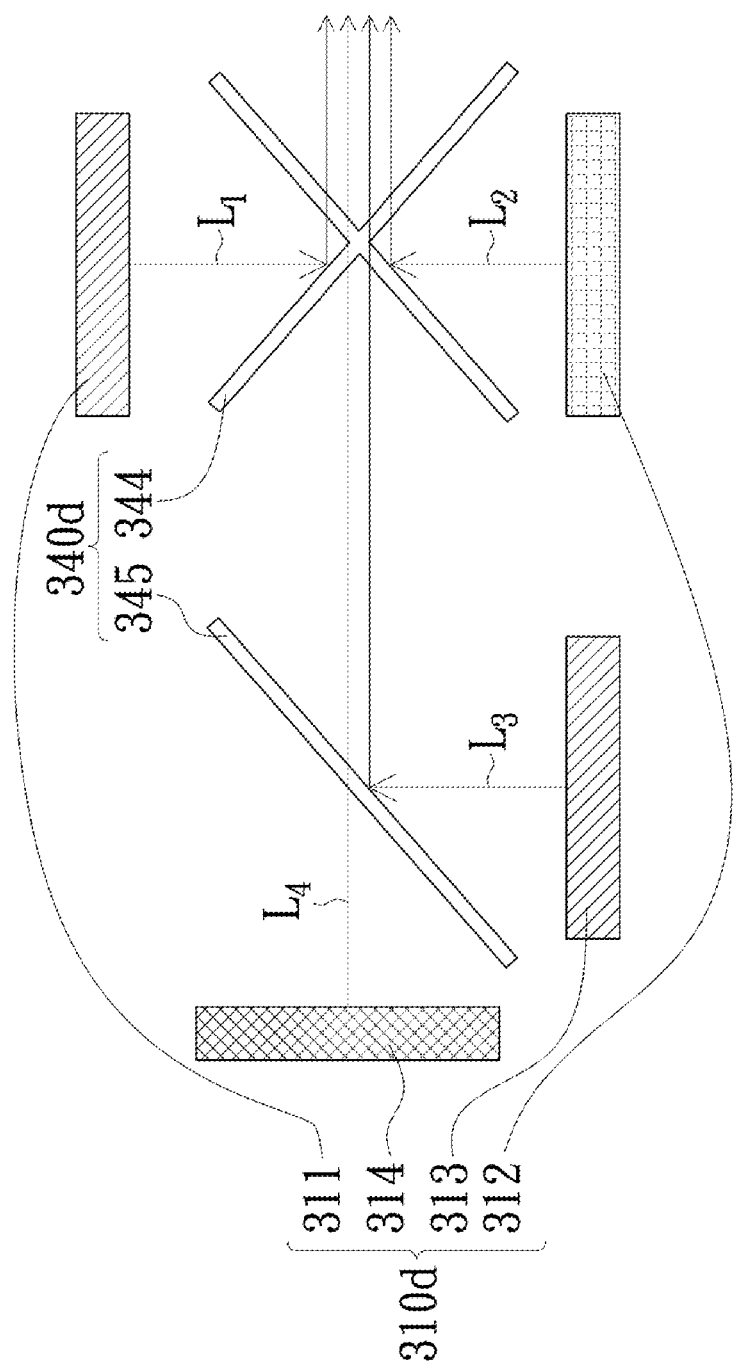

Please refer to FIG. 9. As shown, the structures of light source assembly and light combiner module of the present embodiment of FIG. 9 are similar to that of FIG. 8; thus, only the differences between the two structures will be described in the following. In the present embodiment, the light source assembly 310d further includes a fourth light emitting element 314 configured to emit a fourth light beam L4. The light combiner module 340d includes an X-shaped light combiner element 344 and a dichroic mirror 345. The dichroic mirror 345 is disposed at the intersection of the transmission paths of the third light beam L3 and the fourth light beam L4. The dichroic mirror 345 can reflect the third light beam L3 to the X-shaped light combiner element 344 and the fourth light beam L4 can pass through the dichroic mirror 345 and then is transmitted to the X-shaped light combiner element 344; therefore, the first light beam L1, the second light beam L2, the third light beam L3 and the fourth light beam L4 originally emitting toward different directions can be transmitted to the light valve in the same direction through the light combiner module 340d. In addition, other optical elements may be provided between the light combiner module 340d and the light valve in response to the actual requirements.

Figure 10:
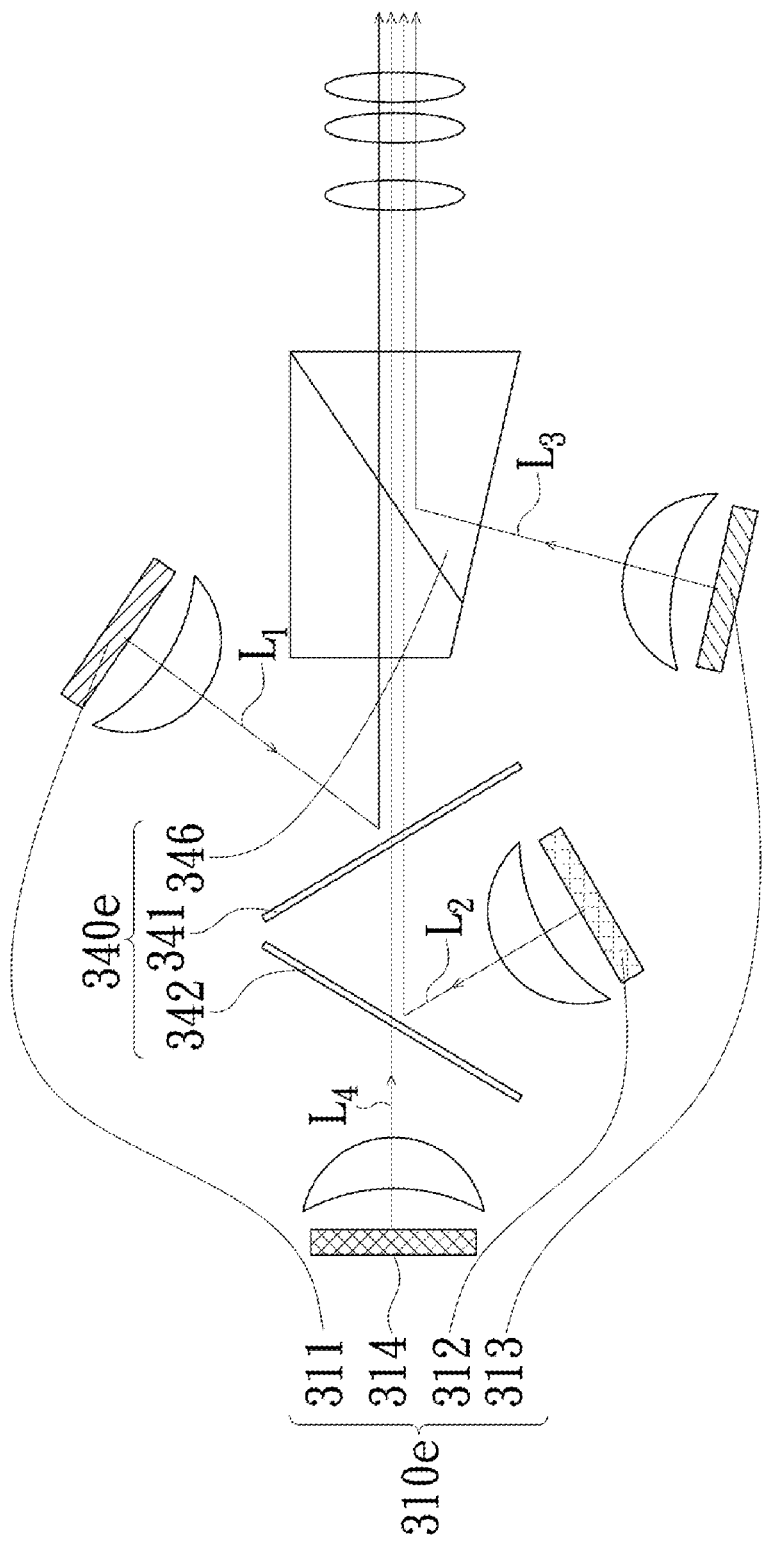

Please refer to FIG. 10. As shown, the light source assembly 310e of the present embodiment is similar to the light source assembly 310d in FIG. 9 and the light combiner module 340e includes the first dichroic mirror 341, the second dichroic mirror 342 and an internal total reflection prism 346. Through the aforementioned configurations, the first light beam L1, the second light beam L2, the third light beam L3 and the fourth light beam L4 originally emitting toward different directions can be transmitted to the light valve in the same direction through the light combiner module 340e. In addition, other optical elements may be provided between the light combiner module 340e and the light valve in response to the actual requirements.

In summary, through providing a liquid photosensitive material containing a variety of photoinitiators and a monomer, selecting a molding beam with a specific wavelength corresponding to a predetermined molding color and irradiating the selected molding beam to the liquid photosensitive material, a solidified layer is formed. Therefore, by only changing the molding beams with different wavelengths, the solidified layers can have different colors and consequentially the printed object formed by the three-dimensional printing method of the present embodiment can have different colors. In addition, through sequentially irradiating the molding beams with different wavelengths to the liquid photosensitive material, an object formed by the sequentially-stacked solidified bodies can have different colors. Further, through simultaneously or non-simultaneously irradiating the molding beams with different wavelengths to different areas of the liquid photosensitive material, the solidified layers on the same level (having the same distance relative to the molding platform) can have different colors.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional printing apparatus, comprising:
   a container, configured to contain a liquid photosensitive material; and
   a projecting structure, configured to provide a variety of molding beams including a first molding beam and a second molding beam for irradiating the liquid photosensitive material to form a plurality of solidified layers;
   wherein the projecting structure comprises a light combiner module, disposed on transmission paths of the first molding beam and the second molding beam;
   wherein the first molding beam and the second molding beam have mutually different wavelengths, and the wavelengths of the first molding beam and the second molding beam are between 355 nm to 415 nm;
   wherein a light valve is disposed downstream of the light combiner module.

2. The three-dimensional printing apparatus according to claim 1, wherein the liquid photosensitive material at least comprises a first photoinitiator and a second photoinitiator, the first photoinitiator is suitable for polymerizing with monomers after receiving the first molding beam to form a first solidified layer with a first color, the second photoinitiator is suitable for polymerizing with monomers after receiving the second molding beam to form a second solidified layer with a second color, and the first color is different from the second color.

3. The three-dimensional printing apparatus according to claim 1, wherein the first molding beam is chosen from one of groups of 395 nm to 415 nm, 375 nm to 395 nm and 355 nm to 375 nm.

4. The three-dimensional printing apparatus according to claim 1, further comprising a molding platform, configured to move in a direction toward or away from the container, wherein one of the plurality of solidified layers is formed on the molding platform.

5. The three-dimensional printing apparatus according to claim 1, wherein the projecting structure comprises:
   a light source assembly, comprising a plurality of light emitting elements configured to emit the variety of respective light beams with different wavelengths;
   wherein the light valve is configured to convert the variety of light beams into the variety of molding beams, the light combiner module is disposed between the light source assembly and the light valve, and the light combiner module is configured to transmit the variety of light beams toward the light valve in the same direction.

6. The three-dimensional printing apparatus according to claim 5, wherein the projecting structure further comprises a lens, provided on the transmission paths of the variety of molding beams and configured to make the variety of molding beams irradiate the liquid photosensitive material in the container.

7. The three-dimensional printing apparatus according to claim 5, wherein each one of the plurality of light emitting elements is configured to emit the respective light beam, and the plurality of light emitting elements are disposed separately.

8. The three-dimensional printing apparatus according to claim 5, wherein each one of the plurality of light emitting elements is configured to emit the respective light beam, and at least two of the plurality of light emitting elements are connected.

9. The three-dimensional printing apparatus according to claim 5, wherein the light combiner module further comprises one selected from three conditions of: (1) a plurality of dichroic mirrors; (2) an X-shaped light combiner element; and (3) an internal total reflection prism.

10. A three-dimensional printing apparatus, comprising:
    a container, configured to contain a liquid photosensitive material; and
    a projecting structure, configured to provide a variety of molding beams to irradiate the liquid photosensitive material, wherein the variety of molding beams at least comprises a first molding beam with a first wavelength and a second molding beam with a second wavelength, and the first wavelength is different from the second wavelength;
    wherein the projecting structure comprises a light combiner module and a light valve, disposed on transmission paths of the variety of molding beams, wherein the light combiner module is configured to transmit the variety of molding beams toward the light valve in the same direction;
    wherein the wavelength of at least one of the variety of molding beams is less than 400 nm.

11. The three-dimensional printing apparatus according to claim 10, wherein the liquid photosensitive material at least comprises a first photoinitiator and a second photoinitiator, the first photoinitiator is suitable for polymerizing with monomers after receiving the first molding beam to form a first solidified layer with a first color, the second photoinitiator is suitable for polymerizing with monomers after receiving the second molding beam to form a second solidified layer with a second color, and the first color is different from the second color.

12. The three-dimensional printing apparatus according to claim 10, wherein the projecting structure comprises:

a light source assembly, comprising a plurality of light emitting elements configured to emit the variety of respective light beams with different wavelengths;

wherein the light valve is configured to convert the variety of light beams into the variety of molding beams; and the light combiner module is disposed between the light source assembly and the light valve.

13. The three-dimensional printing apparatus according to claim 12, wherein the projecting structure further comprises a lens, provided on the transmission paths of the variety of molding beams and configured to make the variety of molding beams irradiate the liquid photosensitive material in the container.

14. The three-dimensional printing apparatus according to claim 10, wherein the variety of molding beams are blue light or ultraviolet light which have different wavelengths, the wavelengths of the variety of molding beams are less than 480 nm.

15. The three-dimensional printing apparatus according to claim 10, wherein the wavelengths of the variety of molding beams are chosen from the group of 395 nm to 415 nm, 375 nm to 395 nm and 355 nm to 375 mm.

16. The three-dimensional printing apparatus according to claim 12, wherein each one of the plurality of light emitting elements is configured to emit the respective light beam, and the plurality of light emitting elements are disposed separately.

17. The three-dimensional printing apparatus according to claim 12, wherein each one of the plurality of light emitting elements is configured to emit the respective light beam, and at least two of the plurality of light emitting elements are connected.

18. The three-dimensional printing apparatus according to claim 12, wherein the light combiner module further comprises a plurality of dichroic mirrors, an X-shaped light combiner element, or an internal total reflection prism.

19. A three-dimensional printing apparatus, comprising:
a container, configured to contain a liquid photosensitive material; and
a projecting structure, configured to provide a variety of molding beams including a first molding beam and a second molding beam for irradiating the liquid photosensitive material to form a plurality of solidified layers;
wherein the projecting structure comprises a light combiner module, disposed on the transmission paths of the first molding beam and the second molding beam;
wherein the light combiner module comprises a plurality of dichroic mirrors, an X-shaped light combiner element, or an internal total reflection prism;
wherein the first molding beam and the second molding beam have mutually different wavelengths, and the wavelengths of the first molding beam and the second molding beam are between 355 nm to 415 nm;
wherein a light valve is disposed downstream of the light combiner module;
wherein the light valve comprises a digital micro mirror device, a liquid-crystal-on-silicon panel, or a transmissive liquid crystal panel.

20. The three-dimensional printing apparatus according to claim 19, wherein the light combiner module is configured to transmit the variety of light beams toward the light valve in the same direction.

* * * * *